US012149030B2

(12) United States Patent
Hoshiba

(10) Patent No.: US 12,149,030 B2
(45) Date of Patent: Nov. 19, 2024

(54) ELECTRICAL CONNECTOR AND ELECTRICAL CONNECTOR SET

(71) Applicant: Murata Manufacturing Co., Ltd., Kyoto-fu (JP)

(72) Inventor: Hiroyuki Hoshiba, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 375 days.

(21) Appl. No.: 17/491,131

(22) Filed: Sep. 30, 2021

(65) Prior Publication Data

US 2022/0021159 A1 Jan. 20, 2022

Related U.S. Application Data

(63) Continuation of application No. PCT/JP2020/033992, filed on Sep. 8, 2020.

(30) Foreign Application Priority Data

Sep. 24, 2019 (JP) ................................ 2019-173175

(51) Int. Cl.
*H01R 13/64* (2006.01)
*H01R 13/6471* (2011.01)
(Continued)

(52) U.S. Cl.
CPC ..... *H01R 13/6471* (2013.01); *H01R 13/6474* (2013.01); *H01R 13/6581* (2013.01); *H01R 13/6597* (2013.01); *H01R 13/03* (2013.01)

(58) Field of Classification Search
CPC .... H01R 12/73; H01R 12/716; H01R 12/712; H01R 12/714; H01R 12/75;
(Continued)

(56) References Cited

U.S. PATENT DOCUMENTS 5,259,768 A * 11/1993 Brunker ............. H01R 13/6585 29/874
6,250,935 B1 * 6/2001 Mochizuki ........... H01R 13/658 439/74
(Continued)

FOREIGN PATENT DOCUMENTS

CN 101667695 A 3/2010
CN 104733897 A * 6/2015
(Continued)

OTHER PUBLICATIONS

International Search Report issued in PCT/JP2020/033992; mailed Dec. 1, 2020.

*Primary Examiner* — Marcus E Harcum
(74) *Attorney, Agent, or Firm* — Studebaker & Brackett PC

(57) ABSTRACT

An electrical connector includes an insulating member, plural signal terminals to be fixed and held to the insulating member, and plural ground terminals to be elastically held to the insulating member. The signal terminals and the ground terminals are disposed in a first direction of the insulating member. Regarding the ground terminal and the signal terminal adjacent to each other as viewed from the first direction, the signal terminal length of the signal terminal in a second direction, which is perpendicular to the first direction, is shorter than the ground terminal length of the ground terminal in the second direction. The signal terminal includes a signal terminal contact engaging portion. The signal terminal contact engaging portion is positioned within a range of the ground terminal length of the ground terminal as viewed from the first direction.

19 Claims, 10 Drawing Sheets

(51) Int. Cl.

| | |
|---|---|
| ***H01R 13/6474*** | (2011.01) |
| ***H01R 13/6581*** | (2011.01) |
| ***H01R 13/6597*** | (2011.01) |
| *H01R 13/03* | (2006.01) |

(58) Field of Classification Search

CPC ............ H01R 13/6471; H01R 13/6474; H01R 13/6581; H01R 13/6597

USPC ............................................................ 439/74

See application file for complete search history.

(56) References Cited

U.S. PATENT DOCUMENTS

| | | | | |
|---|---|---|---|---|
| 6,439,928 | B1 * | 8/2002 | Akama | H01R 13/6585 439/74 |
| 7,585,185 | B2 * | 9/2009 | Obikane | H01R 12/716 439/74 |
| 7,815,467 | B2 * | 10/2010 | Tsuchida | H01R 12/716 439/607.09 |
| 8,961,215 | B2 * | 2/2015 | Hasegawa | H01R 12/00 439/74 |
| 9,647,361 | B2 * | 5/2017 | Kobuchi | H01R 12/707 |
| 2005/0101163 | A1 * | 5/2005 | Obikane | H01R 13/6471 439/74 |
| 2017/0033505 | A1 * | 2/2017 | Ozeki | H01R 13/6581 |
| 2018/0198241 | A1 * | 7/2018 | Ooi | H01R 13/6597 |
| 2019/0089097 | A1 * | 3/2019 | Cho | H01R 13/6471 |
| 2019/0131731 | A1 | 5/2019 | Lee et al. | |
| 2021/0044040 | A1 * | 2/2021 | Zheng | H01R 25/00 |

FOREIGN PATENT DOCUMENTS

| | | | |
|---|---|---|---|
| CN | 109428189 | A | 3/2019 |
| JP | H06-036837 | A | 2/1994 |
| JP | 2010-061847 | A | 3/2010 |
| JP | 2015-002081 | A | 1/2015 |
| JP | 2016-085994 | A | 5/2016 |
| JP | 2017-069133 | A | 4/2017 |
| JP | 2017-216171 | A | 12/2017 |
| JP | 2019-040823 | A | 3/2019 |

* cited by examiner

ELECTRICAL CONNECTOR AND ELECTRICAL CONNECTOR SET

CROSS-REFERENCE TO RELATED APPLICATIONS

This application claims benefit of priority to International Patent Application No. PCT/JP2020/033992, filed Sep. 8, 2020, and to Japanese Patent Application No. 2019-173175, filed Sep. 24, 2019, the entire contents of each are incorporated herein by reference.

BACKGROUND

Technical Field

This disclosure relates to an electrical connector and an electrical connector set.

Background Art

For example, Japanese Unexamined Patent Application Publication No. 2016-85994 discloses a connector in which a first connector including multiple first terminals and a second connector including second terminals to be engaged with the first terminals are fittable with each other. The first terminals of the first connector are constituted by elastic terminals to be elastically held to a first housing so as to exhibit spring properties. In contrast, the second terminals of the second connector are constituted by fixed terminals to be integrally fixed to a second housing.

SUMMARY

In an electrical connector used in a high-frequency band, such as a megahertz or gigahertz band, the occurrence of electromagnetic waves (noise) inside and outside the connector is a problem. In the connector disclosed in Japanese Unexamined Patent Application Publication No. 2016-85994, it is difficult to sufficiently reduce electromagnetic waves (noise) when a signal of a high-frequency band is transmitted through the first terminals.

To address the issue regarding electromagnetic waves (noise), a signal terminal through which a high-frequency signal is transmitted may be sandwiched between ground terminals. However, if signal terminals and ground terminals are formed in the same shape, as in the connector disclosed in Japanese Unexamined Patent Application Publication No. 2016-85994, it is difficult to properly sandwich a signal terminal between ground terminals. If the ground terminals are formed in a large size to properly sandwich a signal terminal, the size of the entire electrical connector is increased. It is thus difficult to secure the shielding properties of the electrical connector and also to reduce the size of the electrical connector.

Accordingly, the present disclosure provides an electrical connector and an electrical connector set in which the shielding properties of the electrical connector can be secured and the size the electrical connector can also be reduced.

An electrical connector according to an aspect of the disclosure includes an insulating member; plural signal terminals to be fixed and held to the insulating member; and plural ground terminals to be elastically held to the insulating member. The signal terminals and the ground terminals are disposed in a first direction of the insulating member. Regarding the ground terminal and the signal terminal adjacent to each other as viewed from the first direction, a signal terminal length of the signal terminal in a second direction, the second direction being perpendicular to the first direction, is shorter than a ground terminal length of the ground terminal in the second direction. The signal terminal includes a signal terminal contact engaging portion. The signal terminal contact engaging portion is positioned within a range of the ground terminal length as viewed from the first direction.

According to this disclosure, a signal terminal having a terminal length shorter than that of a ground terminal is sandwiched between ground terminals, and also, the signal terminal contact engaging portion is positioned within a range of the ground terminal length. It is thus possible to secure the shielding properties of the electrical connector and also to reduce the size of the electrical connector.

DETAILED DESCRIPTION

An embodiment of an electrical connector set 1 according to the disclosure will be described below with reference to the drawings. In the individual drawings, an X axis, a Y axis, and a Z axis perpendicular to each other are shown for the sake of description.

[Electrical Connector Set]

Figure 1:
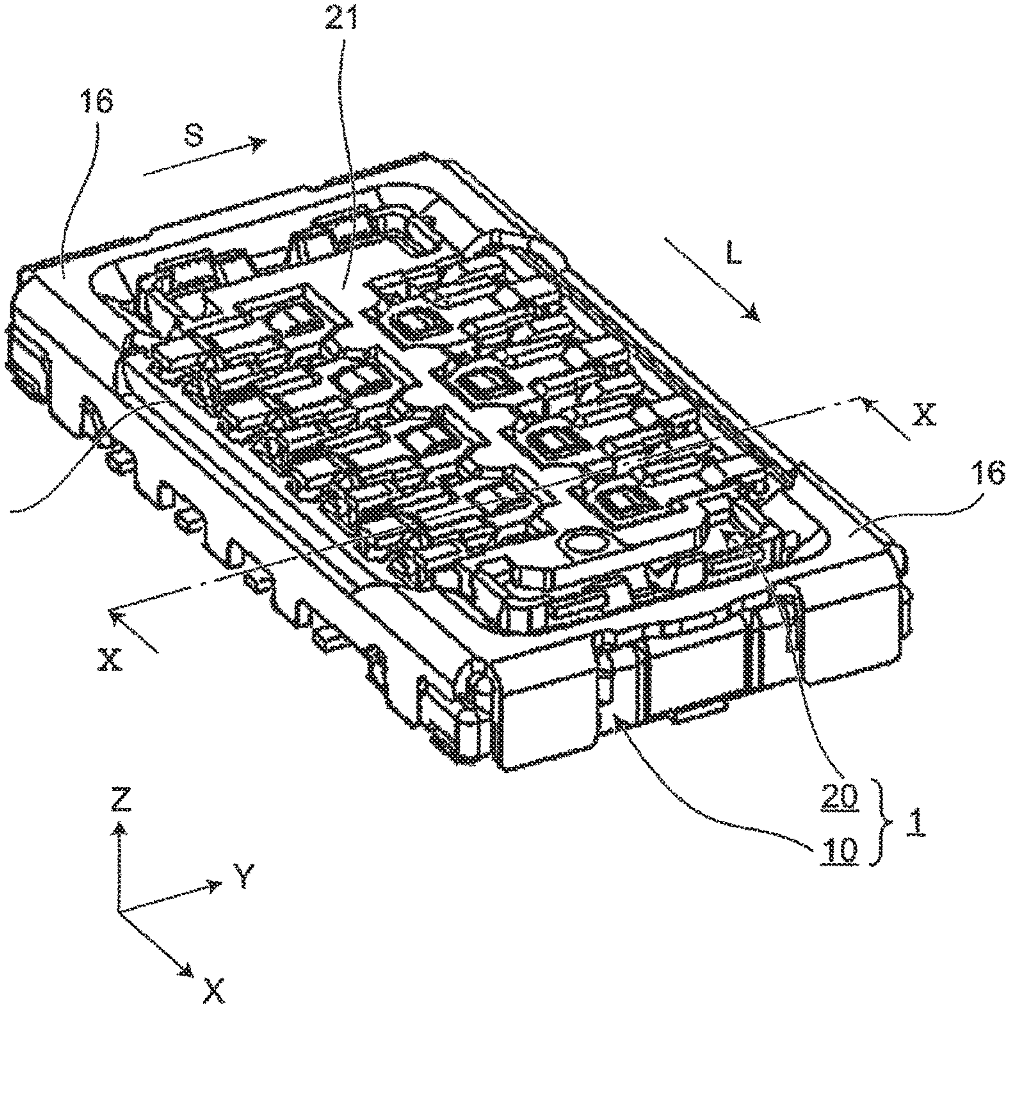
FIG. 1 is a perspective view of an electrical connector set according to an embodiment.

FIG. 1 is a perspective view of the electrical connector set 1 according to an embodiment. In the electrical connector set 1 in FIG. 1, connecters are fitted with each other.

As shown in FIG. 1, the electrical connector set 1 includes a first connector 10 and a second connector 20. The second connector 20 is fittable with the first connector 10 such that it can be inserted into and removed from the first connector 10 in the insertion/removal direction (Z-axis direction). In the electrical connector set 1 shown in FIG. 1, the first connector 10 and the second connector 20 are fitted with each other in the following manner. The second connector 20 is placed to face the first connector 10 and is then moved toward the first connector 10 in the insertion/removal direction (Z-axis direction).

[First Connector]

Figure 2:
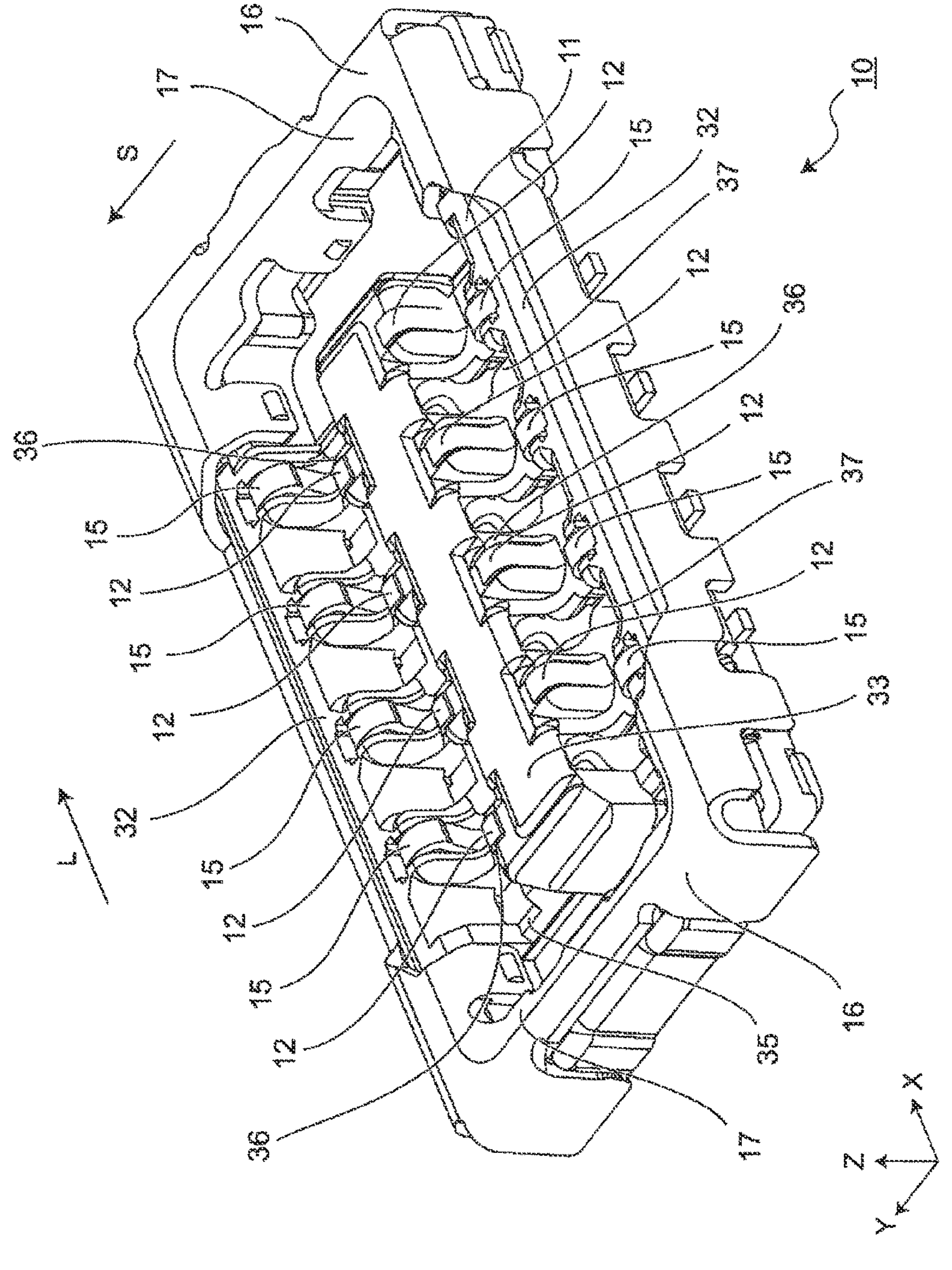
FIG. 2 is a perspective view of a first connector forming the electrical connector set shown in FIG. 1.

FIG. 2 is a perspective view of the first connector 10 forming the electrical connector set 1 shown in FIG. 1. FIG.

Figure 4:
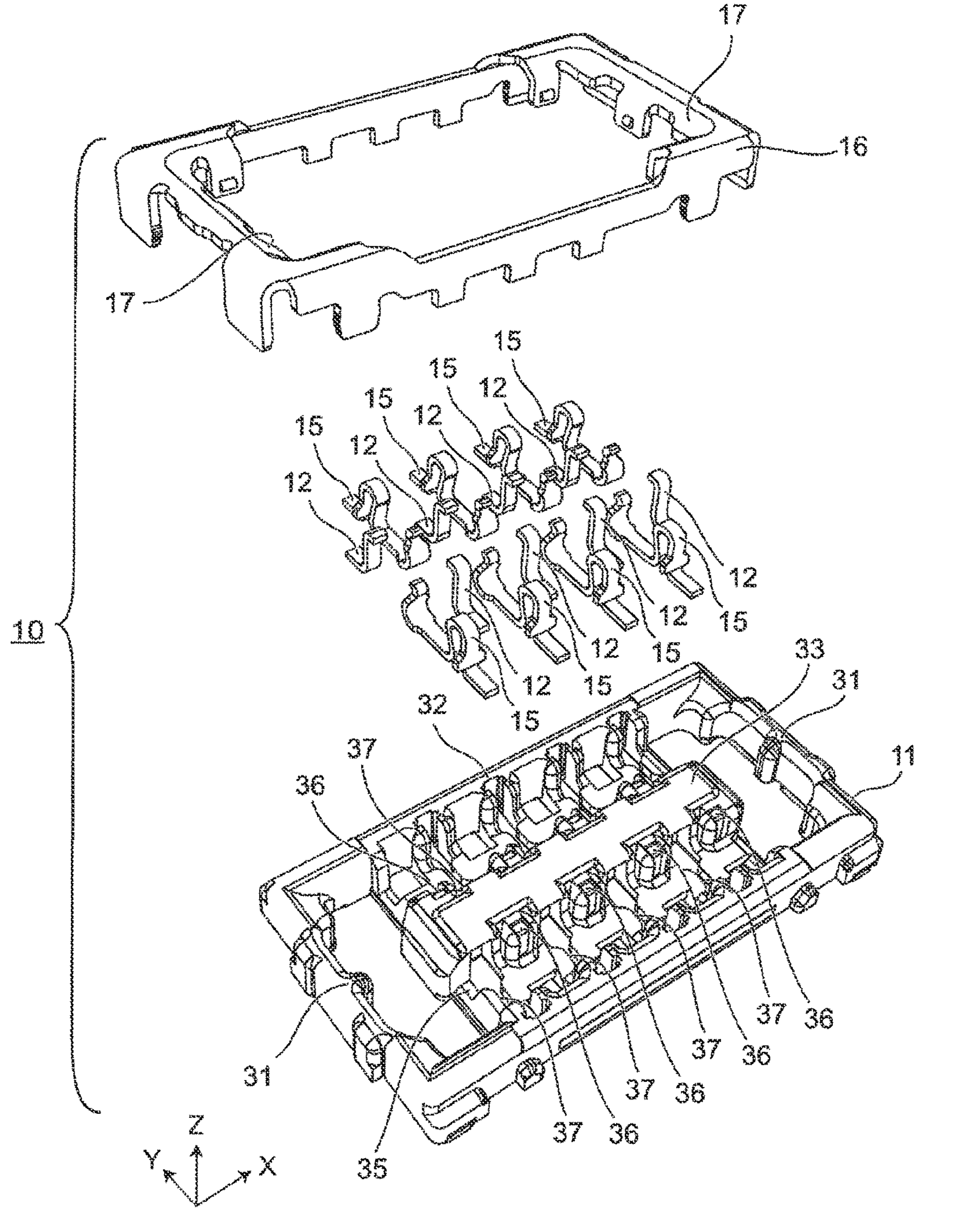
FIG. 4 is an exploded view of the first connector shown in FIG. 2.

3 is a plan view of the first connector 10 shown in FIG. 2. FIG. 4 is an exploded view of the first connector 10 shown in FIG. 2.

Figure 3:
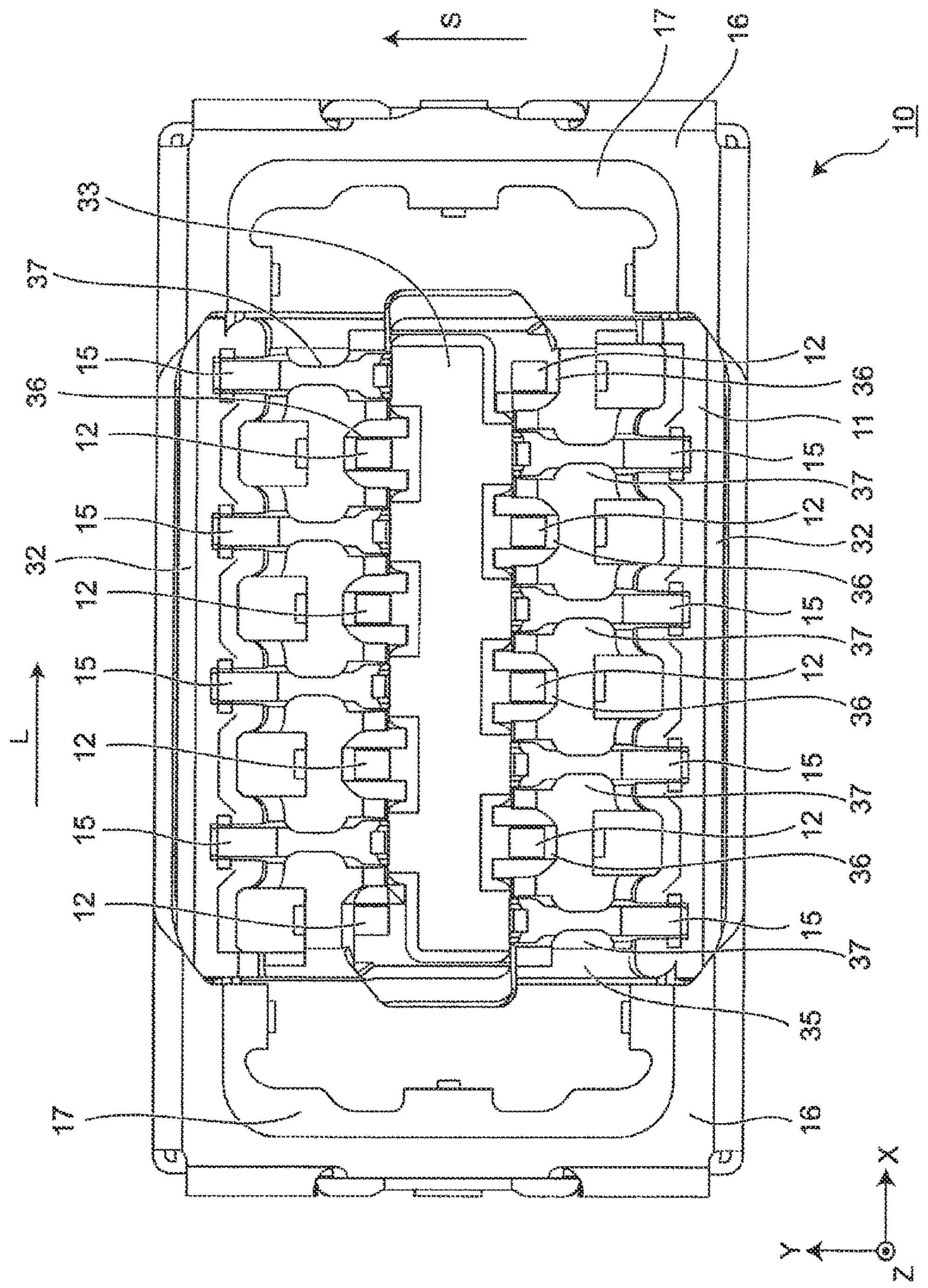
FIG. 3 is a plan view of the first connector shown in FIG. 2.

As shown in FIGS. 2 through 4, the first connector 10 includes a first insulating member (insulating member) 11, first fixed signal terminals (signal terminals) 12, first elastic ground terminals (ground terminals) 15, and a first external ground member (external ground member) 16. The first fixed signal terminals 12 are signal terminals to be fixed and held to the first insulating member 11. The first elastic ground terminals 15 are ground terminals to be held to the first insulating member 11 so as to be elastically displaceable. The first fixed signal terminals 12 and the first elastic ground terminals 15 are both held to the first insulating member 11 merely in different manners and may be made of the same material.

As the first insulating member 11, an electrically insulating resin (liquid crystal polymer, for example) is used. The liquid crystal polymer has higher permittivity than fluoropolymer. The first insulating member 11 has a rectangular shape as viewed from the insertion/removal direction (Z-axis direction) and has two first widthwise wall sections 31, 31, two first longitudinal wall sections 32, 32, one first projecting section 33, and a first bottom wall section 35.

The two first widthwise wall sections 31, 31 extend in a second direction S (Y-axis direction), which is perpendicular to a first direction L (X-axis direction), and are parallel with and oppose each other. The two first longitudinal wall sections 32, 32 extend in the first direction L (X-axis direction) and are parallel with and oppose each other. The first projecting section 33 projects in the insertion/removal direction (Z-axis direction) from the first bottom wall section 35.

First terminal fixing portions 36 are formed on the first projecting section 33 and the first bottom wall section 35 so as to each receive part of the first fixed signal terminals 12. The first fixed signal terminals 12 are fixed and held to the first terminal fixing portions 36 of the first insulating member 11 in the following manner. The first fixed signal terminals 12 are first placed in a mold which forms the first terminal fixing portions 36, and then, the first insulating member 11 is insert-molded together with the first fixed signal terminals 12. The first fixed signal terminals 12 are thus signal terminals fixed to the first insulating member 11. With this configuration, even when a probe is pressed against the first fixed signal terminals 12 for measurement, the first fixed signal terminals 12 are not deformed. It is thus possible to reduce variations of measurement values, which would be caused by deformation of the first fixed signal terminals 12 during measurement.

First terminal mounting portions 37 are formed on the first longitudinal wall sections 32, the first projecting section 33, and the first bottom wall section 35 so as to receive corresponding portions of the first elastic ground terminals 15. As a result of mounting the first elastic ground terminals 15 on the respective first terminal mounting portions 37, the first elastic ground terminals 15 are elastically held to the first terminal mounting portions 37. The first elastic ground terminals 15 are thus ground terminals elastically held to the first insulating member 11.

The first fixed signal terminals 12 are disposed to extend in the second direction S (Y-axis direction) of the first connector 10. In the first connector 10 shown in FIGS. 2 and 3, four first fixed signal terminals 12 are arranged in the first direction L (X-axis direction). Two rows, each including four first fixed signal terminals 12, are arranged in the second direction S (Y-axis direction). Hence, the first connector 10 is a multi-pole connector. The first fixed signal terminals 12 may not necessarily be arranged in two rows in the second direction S (Y-axis direction), and may be arranged in one row or three or more rows. The number of first fixed signal terminals 12 in each row is not limited to four and may be at least one. The number of rows of first fixed signal terminals 12 in the second direction S (Y-axis direction) is smaller than the number of first fixed signal terminals 12 in each row.

In the first connector 10, the first fixed signal terminals 12 and the first elastic ground terminals 15 are alternately disposed in the first direction L (X-axis direction), and multiple rows of such first fixed signal terminals 12 and first elastic ground terminals 15 are arranged in the second direction S (Y-axis direction). In the first connector 10 shown in FIGS. 2 and 3, the first fixed signal terminals 12 are disposed in two rows, that is, first and second rows, in the second direction S (Y-axis direction). In the second direction S (Y-axis direction), the first fixed signal terminals 12 in the first row (certain row) are adjacent to the corresponding first elastic ground terminals 15 in the second row (next row), which is next to the first row (certain row) in the second direction S (Y-axis direction). In other words, in the second direction S (Y-axis direction), the first fixed signal terminals 12 in the first row (certain row) and those in the second row (next row), which is next to the first row (certain row) in the second direction S (Y-axis direction), are not adjacent to each other. This configuration can reduce crosstalk between the first fixed signal terminals 12 in the first row (certain row) and those in the second row (next row).

To reduce interference of electromagnetic waves between the rows of the first fixed signal terminals 12 in the second direction S (Y-axis direction), a conductive shield member (not shown) may be disposed between the rows of the first fixed signal terminals 12, that is, at the first projecting section 33.

Figure 8:
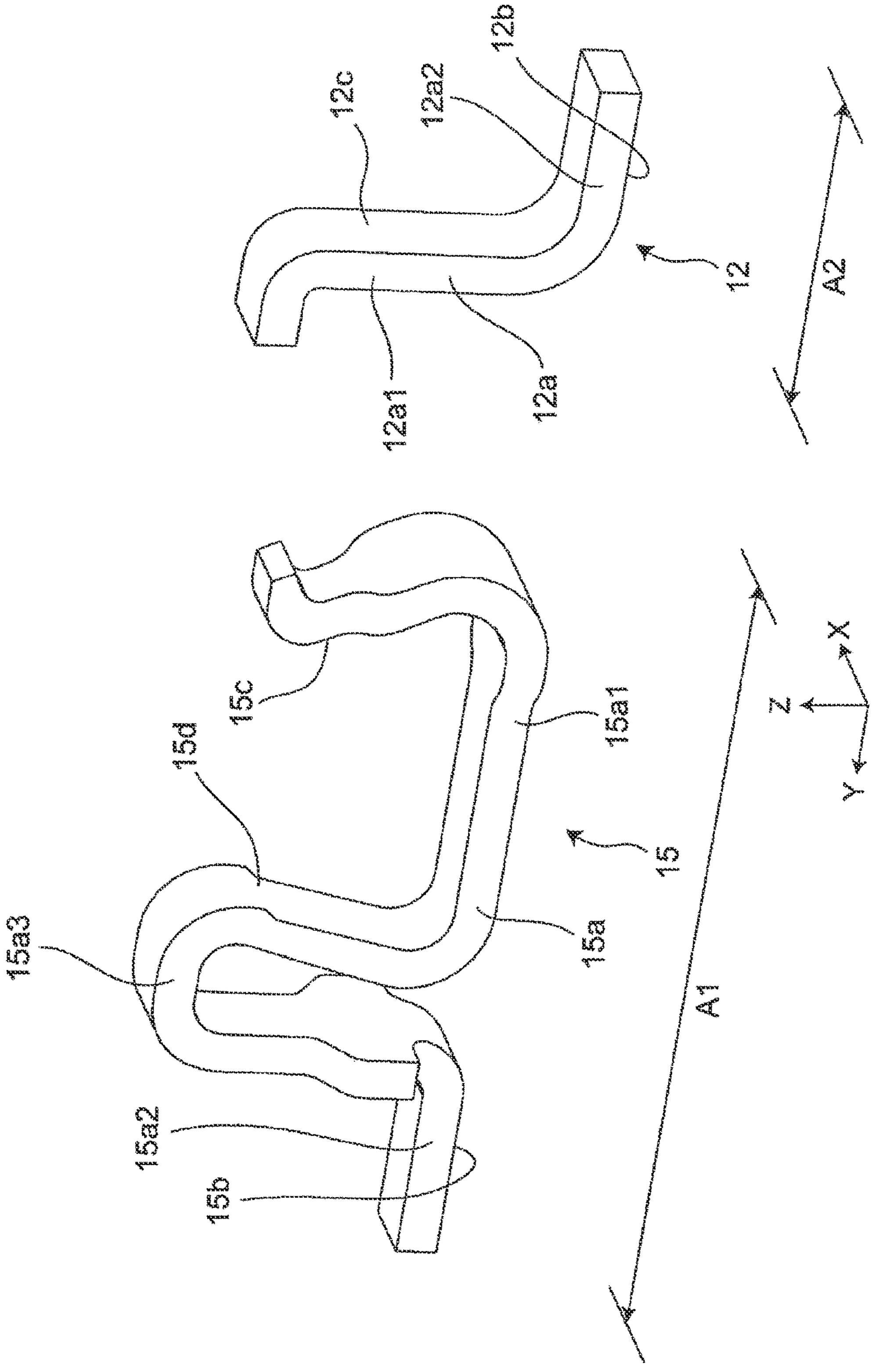
FIG. 8 shows perspective views of a first fixed signal terminal and a first elastic ground terminal of the first connector.

As shown in FIG. 8, the first fixed signal terminal 12 is bent in a substantially L shape and has a first fixed signal terminal body 12*a*, a first fixed signal terminal mounting portion 12*b*, and a first inner-side fixed signal terminal contact portion (signal terminal contact engaging portion) 12*c*. The first fixed signal terminal body 12*a* includes a contact extending portion 12*a*1 extending in the insertion/removal direction (Z-axis direction) and a mounting extending portion 12*a*2 extending in the second direction S (Y-axis direction). The contact extending portion 12*a*1 serves as a first signal terminal engaging portion to be engaged with a mating signal terminal (second elastic signal terminal 22), which will be discussed later. On the bottom surface of the mounting extending portion 12*a*2, the first fixed signal terminal mounting portion 12*b* is provided.

The first inner-side fixed signal terminal contact portion (signal terminal contact engaging portion) 12*c* opposes the outer edge of the first insulating member 11 at a position near the contact extending portion 12*a*1 and is located toward the center of the first insulating member 11. "Toward the center" means near the center of the first insulating member 11 in the second direction S (Y-axis direction) and near the first projecting section 33 if it is provided.

When the first fixed signal terminal 12 is engaged with the second elastic signal terminal 22, the first inner-side fixed signal terminal contact portion 12*c* and a second inner-side elastic signal terminal contact portion 22*c*, which will be discussed later, abut against each other. The first inner-side fixed signal terminal contact portion 12*c*, which serves as a signal terminal contact engaging portion, is thus formed continuously at one portion of the first fixed signal terminal 12.

The first fixed signal terminal 12 is hence a fixed terminal having the single first inner-side fixed signal terminal contact portion 12*c*. As viewed from the first direction L, the first fixed signal terminal 12 has a first signal terminal length (signal terminal length) A2 as the entire length from one end to the other end of the first fixed signal terminal 12 in the second direction S.

The first fixed signal terminals 12 are disposed spaced apart from each other in the first direction (X-axis direction). The first fixed signal terminal 12 is a conductor to be connected to a signal line and is formed by bending a conductive bar-shaped member. The first fixed signal terminals 12 are made of phosphor bronze, for example, which is conductive and elastically deformable. The surfaces of the first fixed signal terminals 12 may be gold-plated, for example. A signal transmitted through the first fixed signal terminals 12 is a high-frequency signal of a megahertz or gigahertz band, for example.

A first elastic ground terminal 15 is disposed to reduce interference of electromagnetic waves between two adjacent first fixed signal terminals 12, 12. The first elastic ground terminals 15 are disposed to extend in the second direction S (Y-axis direction) of the first connector 10. In the first connector 10 shown in FIGS. 2 and 3, four first elastic ground terminals 15 are arranged in the first direction L (X-axis direction). Plural rows, more specifically, two rows, each including four first elastic ground terminals 15, are arranged in the second direction S (Y-axis direction). The first elastic ground terminals 15 and the first fixed signal terminals 12 are alternately arranged in the first direction L. The first elastic ground terminals 15 may not necessarily be arranged in two rows in the second direction S (Y-axis direction), and may be arranged in one row or three or more rows. The number of first elastic ground terminals 15 in each row is not limited to four and may be at least one.

As shown in FIG. 8, the first elastic ground terminal 15 is bent in multiple stages and has a first elastic ground terminal body 15*a*, a first elastic ground terminal mounting portion 15*b*, a first inner-side elastic ground terminal contact portion 15*c*, and a first outer-side elastic ground terminal contact portion 15*d*. The first elastic ground terminal body 15*a* includes an arm portion 15*a*1 bending in a U shape, a mounting extending portion 15*a*2 extending in the second direction S (Y-axis direction), and a bending connecting portion 15*a*3 which is bent to connect the arm portion 15*a*1 and the mounting extending portion 15*a*2. The arm portion 15*a*1 serves as a first ground terminal engaging portion to be engaged with a mating ground terminal (second fixed ground terminal 25). The arm portion 15*a*1 is supported by the bending connecting portion 15*a*3 in a cantilever structure so as to exhibit spring properties. On the bottom surface of the mounting extending portion 15*a*2, the first elastic ground terminal mounting portion 15*b* is provided.

The first inner-side elastic ground terminal contact portion (other-side ground terminal contact engaging portion) 15*c* is located at a side opposite the first outer-side elastic ground terminal contact portion 15*d* with the first inner-side fixed signal terminal contact portion 12*c* interposed therebetween in the second direction S (Y-axis direction). In other words, the first inner-side elastic ground terminal contact portion (other-side ground terminal contact engaging portion) 15*c* opposes the outer edge of the first insulating member 11 at a position near the arm portion 15*a*1 and is located toward the center of the first insulating member 11. "Toward the center" means near the center of the first insulating member 11 in the second direction S (Y-axis direction) and near the first projecting section 33 if it is provided.

The first outer-side elastic ground terminal contact portion (one-side ground terminal contact engaging portion) 15*d* is located toward one side of the second direction S and is also located closer to this side than the first inner-side fixed signal terminal contact portion 12*c*. In other words, the first outer-side elastic ground terminal contact portion (one-side ground terminal contact engaging portion) 15*d* opposes the center of the first insulating member 11 at a position near the arm portion 15*a*1 and is also located toward the outer edge of the first insulating member 11. "Toward the outer edge" means near the outer edge of the first insulating member 11 in the second direction S (Y-axis direction) and means near the first longitudinal wall section 32 if it is provided. With this configuration, it is possible to reduce unwanted radiation of electromagnetic waves (noise) from the first inner-side fixed signal terminal contact portion 12*c* and also to reduce the superimposition of electromagnetic waves (noise) from an external source on a signal transmitted through the first inner-side fixed signal terminal contact portion 12*c*.

When the first elastic ground terminal 15 is engaged with a second fixed ground terminal 25, which will be discussed later, the first inner-side elastic ground terminal contact portion 15*c* and a second inner-side fixed ground terminal contact portion 25*c*, which will be discussed later, abut against each other, and also, the first outer-side elastic ground terminal contact portion 15*d* and a second outer-side fixed ground terminal contact portion 25*d*, which will be discussed later, abut against each other. The first inner-side elastic ground terminal contact portion 15*c* and the first outer-side elastic ground terminal contact portion 15*d*, which serve as ground terminal contact portions, are thus formed in the first elastic ground terminal 15.

The first elastic ground terminal 15 is hence an elastic terminal having the first inner-side elastic ground terminal contact portion 15*c* and the first outer-side elastic ground terminal contact portion 15*d*. As viewed from the first direction L, the first elastic ground terminal 15 has a first ground terminal length (ground terminal length) A1 as the entire length from one end to the other end of the first elastic ground terminal 15 in the second direction S.

The first elastic ground terminals 15 are disposed spaced apart from each other in the first direction L (X-axis direction). The first elastic ground terminal 15 is a conductor to be connected to a ground potential and is formed by bending a conductive bar-shaped member. The first elastic ground terminals 15 are made of phosphor bronze, for example, which is conductive and elastically deformable. The surfaces of the first elastic ground terminals 15 may be gold-plated, for example.

As viewed from above in the insertion/removal direction (Z-axis direction), a first fixed signal terminal 12 is sandwiched between two first elastic ground terminals 15, 15 adjacent to the first fixed signal terminal 12. With this configuration, it is possible to substantially block the electromagnetic waves radiated from an external source and also to reduce unwanted radiation from the first fixed signal terminals 12.

The first external ground member 16 has a rectangular shape and is mounted on the top of the outer peripheral section (two first widthwise wall sections 31, 31 and two first longitudinal wall sections 32, 32). The outer peripheral section of the first insulating member 11 (two first widthwise wall sections 31, 31 and two first longitudinal wall sections 32, 32) is surrounded by the first external ground member 16. The first external ground member 16 is connected to a ground potential, so that a space surrounded by the first external ground member 16 can be formed into an electromagnetic-wave shielded space, thereby blocking electromagnetic waves radiated from an external source and unwanted radiation from the first fixed signal terminals 12.

The first external ground member 16 includes a guide section 17 at the inner side. The first external ground member 16 serves as a guiding function when fitting with a second external ground member 26 of the second connector 20 and also has a function as a ground terminal to be electrically connected to a ground potential.

The first external ground member 16 is a conductor connected to a ground potential. As the first external ground member 16, phosphor bronze, for example, which is conductive and elastically deformable, may be used. The first external ground member 16 is formed by bending, for example.

[Second Connector]

Figure 5:
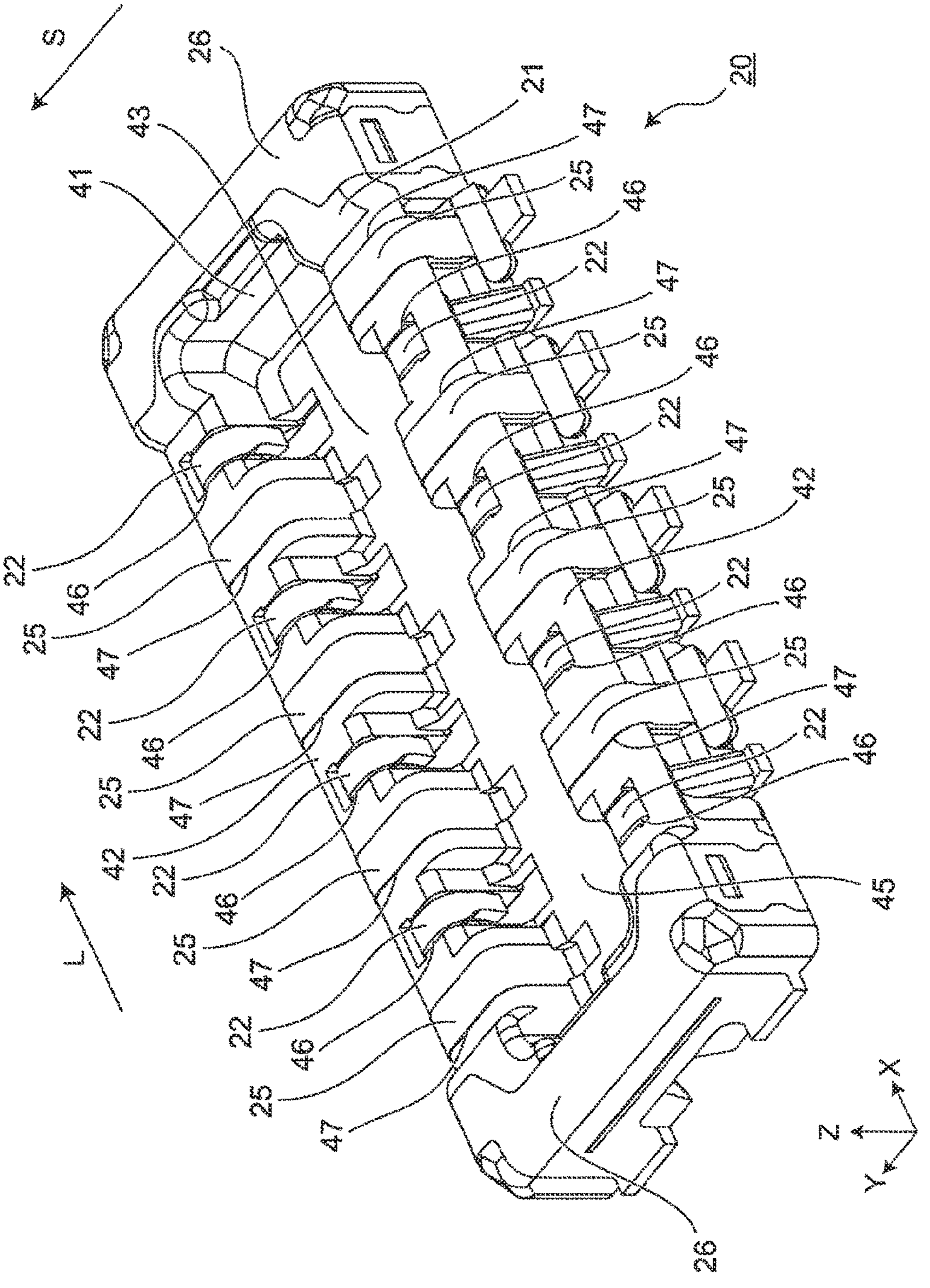
FIG. 5 is a perspective view of a second connector forming the electrical connector set shown in FIG. 1.
Figure 6:
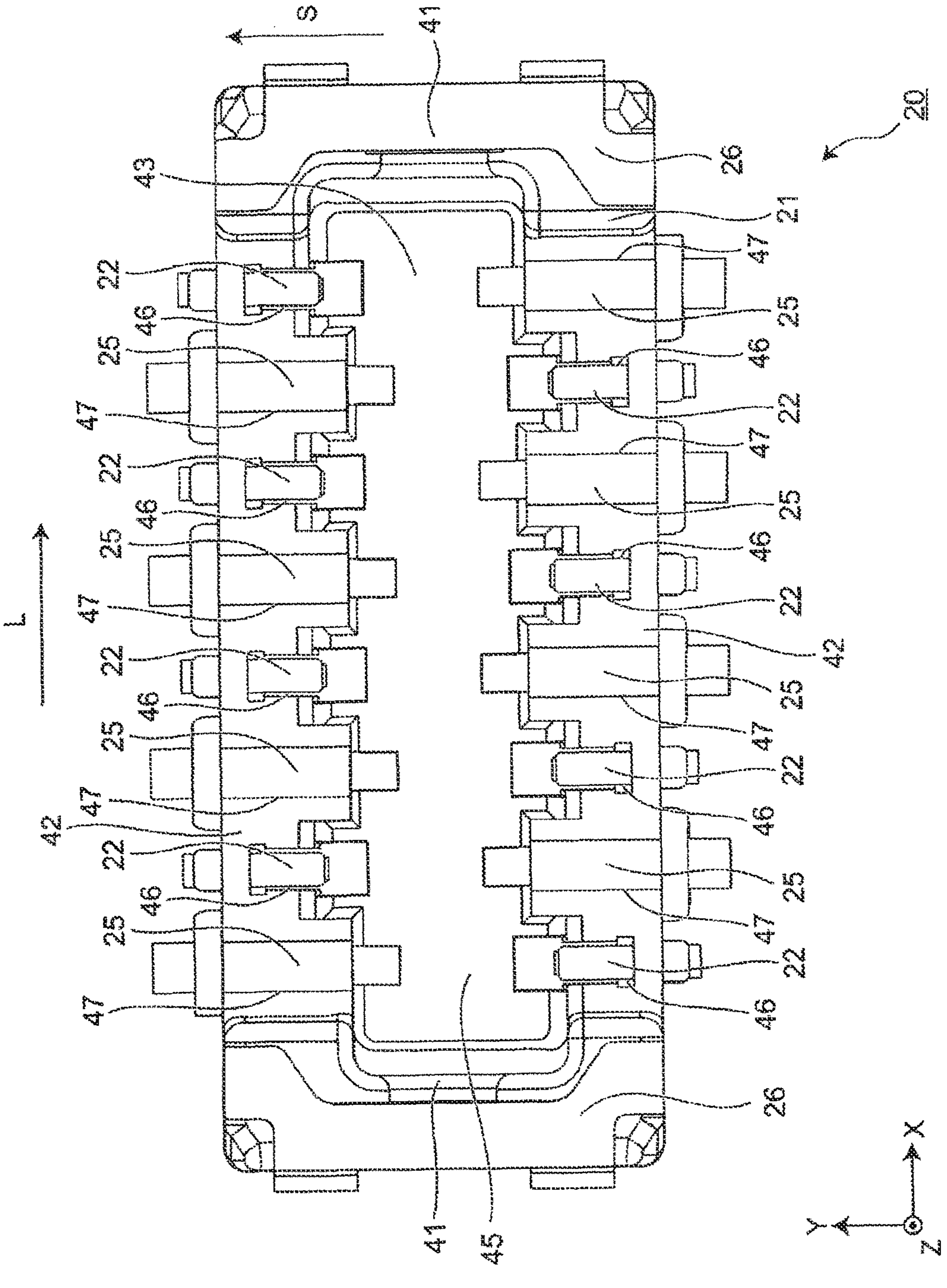
FIG. 6 is a plan view of the second connector shown in FIG. 5.
Figure 7:
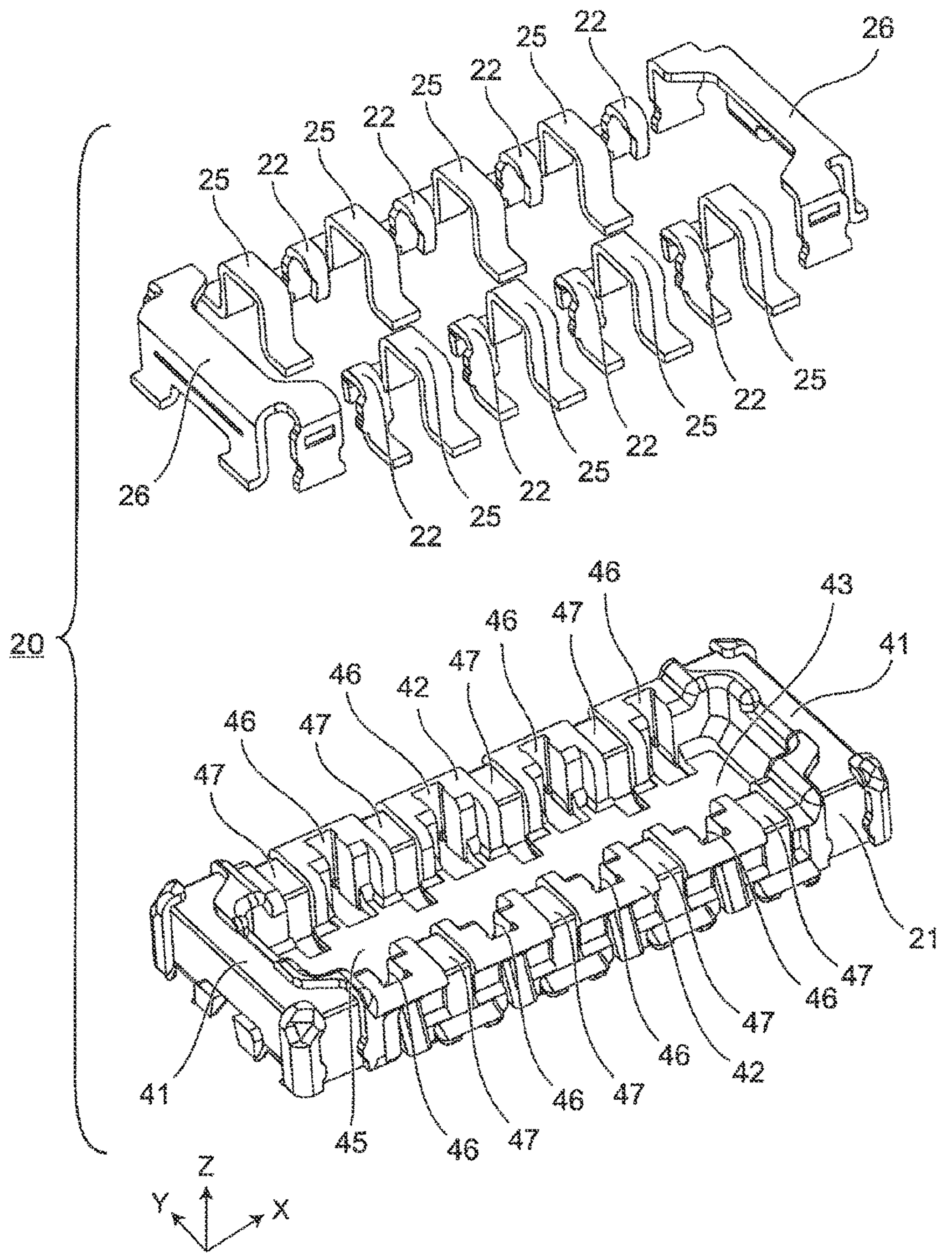
FIG. 7 is an exploded view of the second connector shown in FIG. 5.

FIG. 5 is a perspective view of the second connector 20 forming the electrical connector set 1 shown in FIG. 1. FIG. 6 is a plan view of the second connector 20 shown in FIG. 5. FIG. 7 is an exploded view of the second connector 20 shown in FIG. 5.

The second connector 20 includes a second insulating member (insulating member) 21, second elastic signal terminals (signal terminals) 22, second fixed ground terminals (ground terminals) 25, and second external ground members (external ground members) 26. The second fixed ground terminals 25 and the second elastic signal terminals 22 are alternately disposed in the first direction L.

As the second insulating member 21, an electrically insulating resin (liquid crystal polymer, for example) is used. The liquid crystal polymer has higher permittivity than fluoropolymer. The second insulating member 21 has a rectangular shape as viewed from the insertion/removal direction (Z-axis direction) and has two second widthwise wall sections 41, 41, two second longitudinal wall sections 42, 42, one second recessed section 43, and a second bottom wall section 45.

The two second widthwise wall sections 41, 41 extend in the second direction S (Y-axis direction) and are parallel with and oppose each other. The two second longitudinal wall sections 42, 42 extend in the first direction L (X-axis direction) and are parallel with and oppose each other. The second recessed section 43 is a space surrounded by the second bottom wall section 45, the second longitudinal wall sections 42, 42, and the second widthwise wall sections 41, 41. The above-described first projecting section 33 is stored in and engaged with the second recessed section 43.

Second terminal mounting portions 46 are formed on the second longitudinal wall sections 42 and the second bottom wall section 45 so as to receive corresponding portions of the second elastic signal terminals 22. As a result of mounting the second elastic signal terminals 22 on the respective second terminal mounting portions 46, the second elastic signal terminals 22 are elastically held to the second terminal mounting portions 46. The second elastic signal terminals 22 are thus signal terminals elastically held to the second insulating member 21.

Second terminal fixing portions 47 are formed on the second longitudinal wall sections 42 and the second bottom wall section 45 so as to each receive part of the second fixed ground terminals 25. The second fixed ground terminals 25 are fixed and held to the second terminal fixing portions 47 of the second insulating member 21 in the following manner. The second fixed ground terminals 25 are placed in a mold which forms the second terminal fixing portions 47, and then, the second insulating member 21 is insert-molded together with the second fixed ground terminals 25. The second fixed ground terminals 25 are thus ground terminals fixed to the second insulating member 21. With this configuration, even when a probe is pressed against the second fixed ground terminals 25 for measurement, the second fixed ground terminals 25 are not deformed. It is thus possible to reduce variations of measurement values, which would be caused by deformation of the second fixed ground terminals 25 during measurement.

The second elastic signal terminals 22 are disposed to extend in the second direction S (Y-axis direction) of the second connector 20. In the second connector 20 shown in FIGS. 5 and 6, four second elastic signal terminals 22 are arranged in the first direction L (X-axis direction). Plural rows, more specifically, two rows, each including four second elastic signal terminals 22, are arranged in the second direction S (Y-axis direction). Hence, the second elastic signal terminals 22 are multi-pole signal terminals. The second elastic signal terminals 22 may not necessarily be arranged in two rows in the second direction S (Y-axis direction), and may be arranged in one row or three or more rows. The number of second elastic signal terminals 22 in each row is not limited to four and may be at least one.

In the second connector 20, the second elastic signal terminals 22 and the second fixed ground terminals 25 are alternately disposed in the first direction L (X-axis direction), and multiple rows of such second elastic signal terminals 22 and second fixed ground terminals 25 are arranged in the second direction S (Y-axis direction). In the second connector 20 shown in FIGS. 4 and 5, the second elastic signal terminals 22 are disposed in two rows, that is, first and second rows, in the second direction S (Y-axis direction). In the second direction S (Y-axis direction), the first fixed signal terminals 12 in the first row (certain row) are adjacent to the corresponding first elastic ground terminals 15 in the second row (next row), which is next to the first row (certain row) in the second direction S (Y-axis direction). In other words, in the second direction S (Y-axis direction), the second elastic signal terminals 22 in the first row (certain row) and those in the second row (next row), which is next to the first row (certain row) in the second direction S (Y-axis direction), are not adjacent to each other. This configuration can reduce crosstalk between the second elastic signal terminals 22 in the first row (certain row) and those in the second row (next row).

Figure 9:
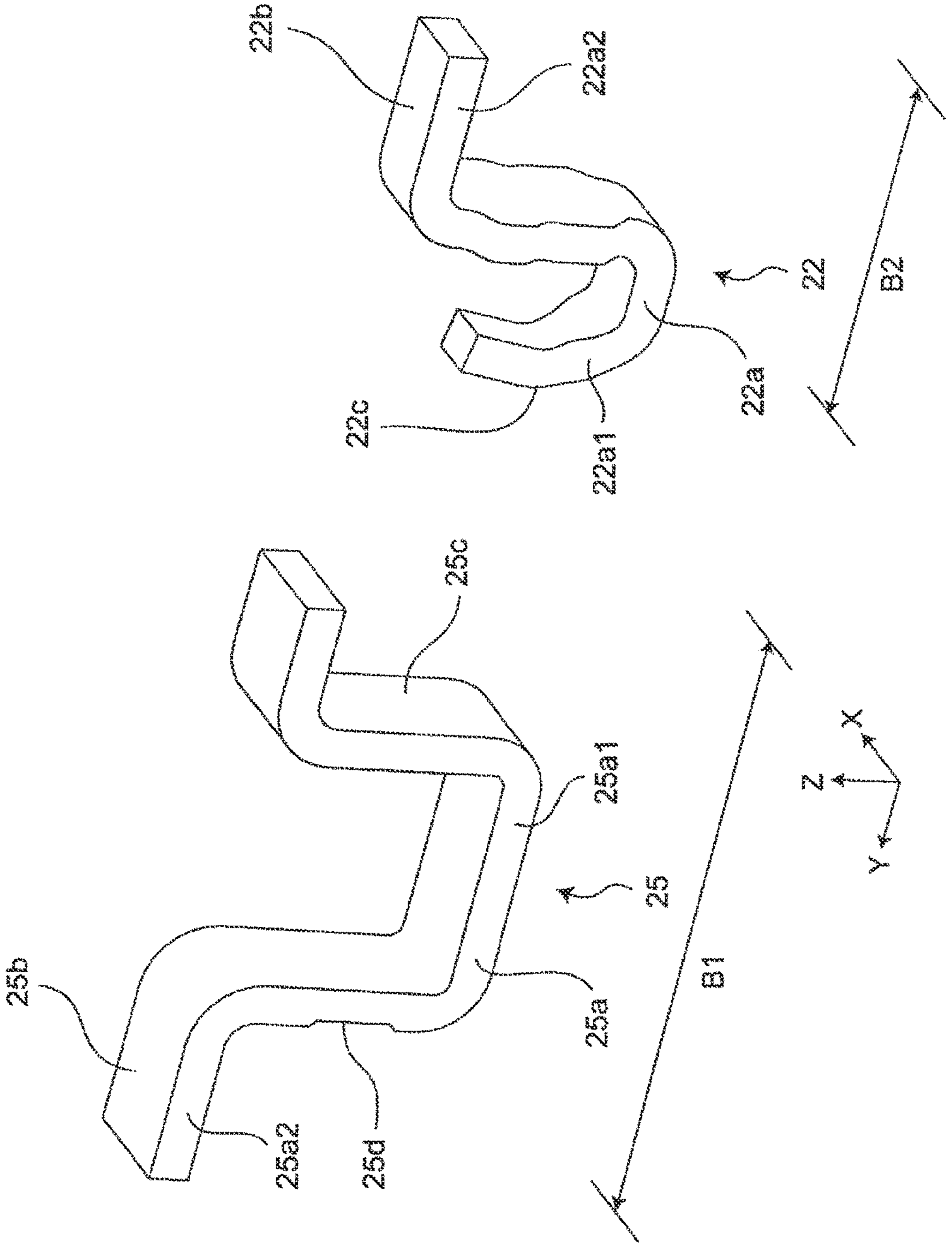
FIG. 9 shows perspective views of a second elastic signal terminal and a second fixed ground terminal of the second connector.

As shown in FIG. 9, the second elastic signal terminal 22 is bent so as to project in a substantially J shape and has a second elastic signal terminal body **22*a*, a second elastic signal terminal mounting portion 22*b*, and a second inner-side elastic signal terminal contact portion (signal terminal contact engaging portion) 22*c*. The second elastic signal terminal body 22*a* includes a bending end portion 22*a*1 bending to project in a J shape and a mounting extending portion 22*a*2 extending in the second direction S (Y-axis direction). The bending end portion 22*a*1 is supported by the mounting extending portion 22*a*2 in a cantilever structure so as to exhibit spring properties. The bending end portion 22*a*1 serves as a second signal terminal engaging portion to be engaged with a mating signal terminal (first fixed signal terminal 12). On the top surface of the mounting extending portion 22*a*2, the second elastic signal terminal mounting portion 22*b*** is provided.

The second inner-side elastic signal terminal contact portion (signal terminal contact engaging portion) **22*c*** opposes the center of the second insulating member 21 at a position near the bending end portion **22*a*1 and is located toward the center of the second insulating member 21. "Toward the center" means near the center of the second insulating member 21 in the second direction S (Y-axis direction) and near the second recessed section 43 if it is provided. When the first fixed signal terminal 12 and the second elastic signal terminal 22 are engaged with each other, the first inner-side fixed signal terminal contact portion 12*c* and the second inner-side elastic signal terminal contact portion 22*c* abut against each other. The second inner-side elastic signal terminal contact portion 22*c*, which serves as a signal terminal contact engaging portion, is formed continuously at one portion of the second elastic signal terminal 22**.

The second elastic signal terminal 22 is hence an elastic terminal having the single second inner-side elastic signal terminal contact portion **22*c*. As viewed from the first direction L, the second elastic signal terminal 22 has a second signal terminal length (signal terminal length) B2 as the entire length from one end to the other end of the second elastic signal terminal 22** in the second direction S.

The second elastic signal terminals 22 are disposed spaced apart from each other in the first direction L (X-axis direction). The second elastic signal terminal 22 is a conductor to be connected to a signal potential and is formed by bending a conductive bar-shaped member. The second elastic signal terminals 22 are made of phosphor bronze, for example, which is conductive and elastically deformable. The surfaces of the second elastic signal terminals 22 may be gold-plated, for example. A signal transmitted through the second elastic signal terminals 22 is a high-frequency signal of a megahertz or gigahertz band, for example.

As shown in FIG. 9, the second fixed ground terminal 25 is bent in multiple stages to project in a U shape, for example, and has a second fixed ground terminal body **25*a*, a second fixed ground terminal mounting portion 25*b*, a second inner-side fixed ground terminal contact portion 25*c*, and a second outer-side fixed ground terminal contact portion 25*d*. The second fixed ground terminal body 25*a* includes a bending contact portion 25*a*1 projecting in a U shape and a mounting extending portion 25*a*2 extending in the second direction S (Y-axis direction). The bending contact portion 25*a*1 serves as a second ground terminal engaging portion to be engaged with a mating ground terminal (first elastic ground terminal 15). On the top surface of the mounting extending portion 25*a*2, the second fixed ground terminal mounting portion 25*b*** is provided.

The second inner-side fixed ground terminal contact portion (other-side ground terminal contact engaging portion) **25*c* is located at a side opposite the second outer-side fixed ground terminal contact portion 25*d* with the second inner-side elastic signal terminal contact portion 22*c* interposed therebetween in the second direction S (Y-axis direction). In other words, the second inner-side fixed ground terminal contact portion (other-side ground terminal contact engaging portion) 25*c* opposes the center of the second insulating member 21 at a position near the bending contact portion 25*a*1 and is located toward the center of the second insulating member 21. "Toward the center" means near the center of the second insulating member 21 in the second direction S (Y-axis direction) and near the second recessed section 43** if it is provided.

The second outer-side fixed ground terminal contact portion (one-side ground terminal contact engaging portion) **25*d* is located toward one side of the second direction S and is also located closer to this side than the second inner-side elastic signal terminal contact portion 22*c*. In other words, the second outer-side fixed ground terminal contact portion (one-side ground terminal contact engaging portion) 25*d* opposes the outer edge of the second insulating member 21 at a position near the bending contact portion 25*a*1 and is also located toward the outer edge of the second insulating member 21. "Toward the outer edge" means near the outer edge of the second insulating member 21 in the second direction S (Y-axis direction) and means the side opposite the second recessed section 43 in the second direction S (Y-axis direction) if the second recessed section 43** is provided.

When the first elastic ground terminal 15 and the second fixed ground terminal 25 are engaged with each other, the first inner-side elastic ground terminal contact portion **15*c* and the second inner-side fixed ground terminal contact portion 25*c* abut against each other, and also, the first outer-side elastic ground terminal contact portion 15*d* and the second outer-side fixed ground terminal contact portion 25*d* abut against each other. The second inner-side fixed ground terminal contact portion 25*c* and the second outer-side fixed ground terminal contact portion 25*d*, which serve as ground terminal contact portions, are thus formed in the second fixed ground terminal 25**.

The second fixed ground terminal 25 is hence a fixed terminal having the second inner-side fixed ground terminal contact portion **25*c* and the second outer-side fixed ground terminal contact portion 25*d*. As viewed from the first direction L, the second fixed ground terminal 25 has a second ground terminal length (ground terminal length) B1 as the entire length from one end to the other end of the second fixed ground terminal 25** in the second direction S.

The second fixed ground terminals 25 are disposed spaced apart from each other in the first direction L (X-axis direction). The second fixed ground terminal 25 is a conductor to be connected to a ground potential and is formed by bending a conductive bar-shaped member. The second fixed ground terminals 25 are made of phosphor bronze, for example, which is conductive and elastically deformable. The surfaces of the second fixed ground terminals 25 may be gold-plated, for example.

As viewed from above in the insertion/removal direction (Z-axis direction), a second elastic signal terminal 22 is sandwiched between two second fixed ground terminal 25, 25 adjacent to the second elastic signal terminal 22. With this configuration, it is possible to substantially block electromagnetic waves radiated from an external source and also to reduce unwanted radiation from the second elastic signal terminals 22.

The second external ground members 26, 26 are mounted on the respective second widthwise wall sections 41, 41. That is, the second external ground members 26, 26 are disposed spaced apart from each other in the first direction L (X-axis direction). The second external ground members 26 have a function of fitting with the above-described first external ground member 16 and a function as a ground terminal to be electrically connected to a ground potential.

The second external ground member 26 is a conductor connected to a ground potential. As the second external ground members 26, phosphor bronze, for example, which is conductive and elastically deformable, may be used. The second external ground members 26 are formed by bending, for example. The second external ground members 26 are connected to a ground potential, so that a space surrounded by the second external ground members 26 can be formed into an electromagnetic-wave shielded space, thereby blocking electromagnetic waves radiated from an external source and unwanted radiation from the second elastic signal terminals 22.

[Engaging Structure and Fitting Structure in Electrical Connector Set]

Figure 10:
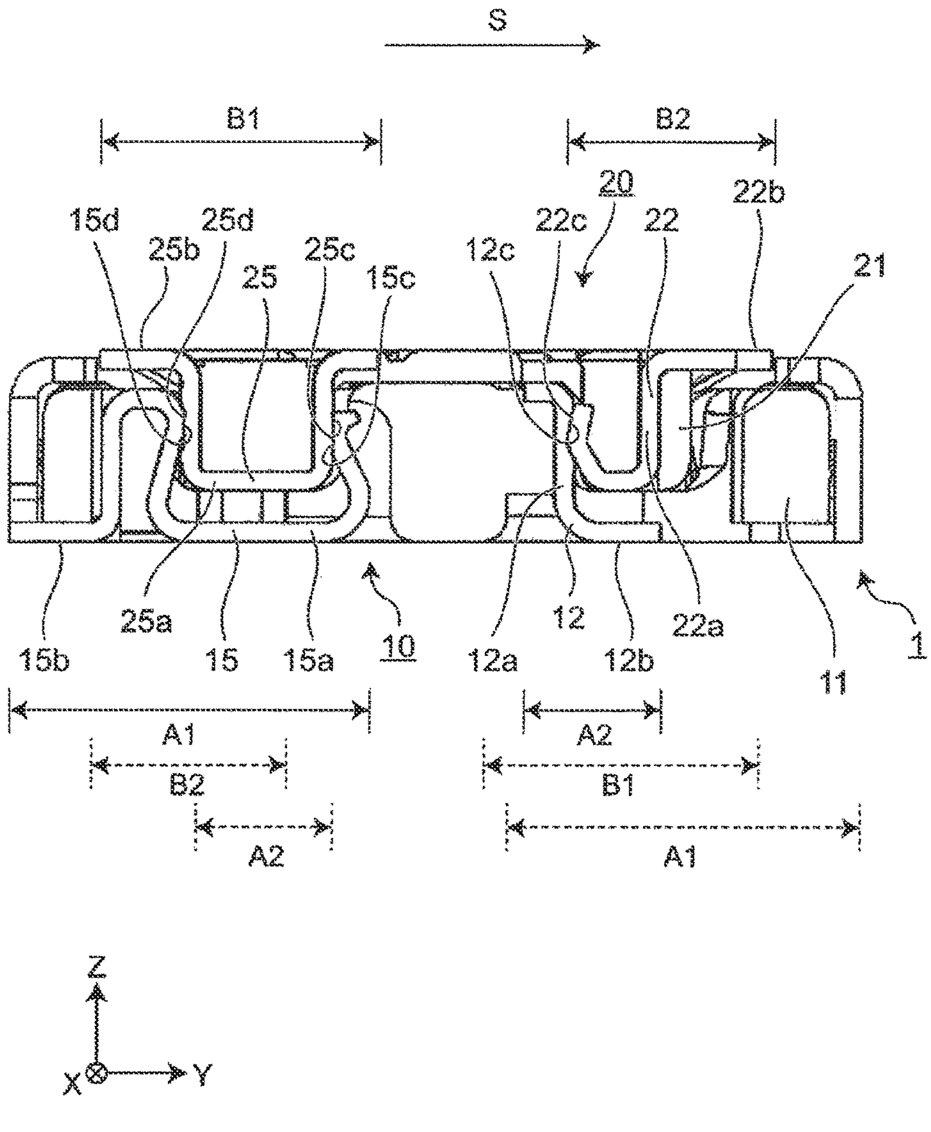
FIG. 10 is a sectional view taken along line X-X in FIG. 1.

The engaging structure and the fitting structure in the electrical connector set 1 will be explained below with reference to FIG. 10. FIG. 10 is a sectional view taken along line X-X in FIG. 1.

In the electrical connector set 1, the second connector 20 is fit into the first connector 10 in the following manner. The second connector (mating electrical connector) 20 is placed to face the first connector (electrical connector) 10 and is then pressed into the first connector 10 in the insertion/removal direction (Z-axis direction).

In this state, the first external ground member 16 of the first connector 10 is fitted with the second external ground members 26 of the second connector 20. In this fitting state, the second elastic signal terminal body 22*a* of the second elastic signal terminal 22 is engaged with the first fixed signal terminal body 12*a* of the first fixed signal terminal 12. In this state, as shown in FIG. 10, the second inner-side elastic signal terminal contact portion (signal terminal contact engaging portion) 22*c* of the second elastic signal terminal 22 contacts the first inner-side fixed signal terminal contact portion (signal terminal contact engaging portion) 12*c* of the first fixed signal terminal 12. This electrically connects the first fixed signal terminal 12 and the second elastic signal terminal 22 with each other.

In the above-described fitting state, the second fixed ground terminal body 25*a* of the second fixed ground terminal 25 is engaged with the first elastic ground terminal body 15*a* of the first elastic ground terminal 15. In this state, the first inner-side elastic ground terminal contact portion 15*c* of the first elastic ground terminal 15 contacts the second inner-side fixed ground terminal contact portion 25*c* of the second fixed ground terminal 25, and also, the first outer-side elastic ground terminal contact portion 15*d* of the first elastic ground terminal 15 contacts the second outer-side fixed ground terminal contact portion 25*d* of the second fixed ground terminal 25. This electrically connects the first elastic ground terminal 15 and the second fixed ground terminal 25 with each other.

In the first connector 10, the first fixed signal terminals 12 and the first elastic ground terminals 15 are alternately disposed in the first direction L (X-axis direction). In the second connector 20, the second elastic signal terminals 22 and the second fixed ground terminals 25 are alternately disposed in the first direction L (X-axis direction). To indicate the relationship between the terminal lengths A1, A2, B2, and B1 of the terminals 12, 15, 22, and 25, the terminal lengths A1, A2, B2, and B1 of the terminals 12, 15, 22, and 25, which are positioned forward and backward of X-X line in FIG. 1 in the first direction L and are unseen in FIG. 10, are indicated by the imaginary broken lines in FIG. 10.

In the first connector 10, as viewed from the first direction L (X-axis direction), the first ground terminal length A1 of the first elastic ground terminal 15 in the second direction S is longer than the first signal terminal length A2 of the first fixed signal terminal 12 in the second direction S. In other words, in the first connector 10, as viewed from the first direction L (X-axis direction), the first signal terminal length A2 of the first fixed signal terminal 12 in the second direction S is shorter than the first ground terminal length A1 of the first elastic ground terminal 15 in the second direction S. In the second connector 20, as viewed from the first direction L (X-axis direction), the second ground terminal length B1 of the second fixed ground terminal 25 in the second direction S is longer than the second signal terminal length B2 of the second elastic signal terminal 22 in the second direction S. In other words, in the second connector 20, as viewed from the first direction L (X-axis direction), the second signal terminal length B2 of the second elastic signal terminal 22 in the second direction S is shorter than the second ground terminal length B1 of the second fixed ground terminal 25 in the second direction S.

In the first connector 10, in a side view along the first direction L (X-axis direction), the first inner-side fixed signal terminal contact portion 12*c* of the first fixed signal terminal 12 is positioned within a range of the first ground terminal length A1 of the first elastic ground terminal 15. In other words, when the first inner-side fixed signal terminal contact portion 12*c* of the first fixed signal terminal 12 is projected on a plane (XY plane), it is positioned between one end and the other end of the first elastic ground terminal 15 in the Y-axis direction. In the second connector 20, in a side view along the first direction L (X-axis direction), the second inner-side elastic signal terminal contact portion 22*c* of the second elastic signal terminal 22 is positioned within a range of the second ground terminal length B1 of the second fixed ground terminal 25. In other words, when the second inner-side elastic signal terminal contact portion 22*c* of the second elastic signal terminal 22 is projected on a plane (XY plane), it is positioned between one end and the other end of the second fixed ground terminal 25 in the Y-axis direction. The fixed terminals (such as the first fixed signal terminal 12 and second fixed ground terminal 25) are more resistant to deformation than the elastic terminals (such as the first elastic ground terminal 15 and second elastic signal terminal 22) and are thus less likely to be displaced in the second direction S. The shielding properties are thus less likely to deteriorate, which would otherwise be degraded by a positional displacement of the terminals when they are fitted with each other.

In the first connector 10, the first outer-side elastic ground terminal contact portion 15*d* of the first elastic ground terminal 15 is located farther outward in the second direction S (Y-axis direction) than the first inner-side fixed signal terminal contact portion 12*c* of the first fixed signal terminal 12. With this configuration, as viewed from the second direction S (Y-axis direction), the first inner-side fixed signal terminal contact portion 12*c* is sandwiched between the two first outer-side elastic ground terminal contact portions 15*d*, 15*d* adjacent to the first inner-side fixed signal terminal contact portion 12*c*. It is thus possible to substantially block electromagnetic waves radiated from an external source and also to reduce unwanted radiation from the first fixed signal terminals 12 in the second direction S (Y-axis direction).

In the second connector 20, the second outer-side fixed ground terminal contact portion 25*d* of the second fixed ground terminal 25 is located farther outward in the second direction S (Y-axis direction) than the second inner-side elastic signal terminal contact portion 22*c* of the second elastic signal terminal 22. With this configuration, as viewed from the second direction S (Y-axis direction), the second inner-side elastic signal terminal contact portion 22*c* is sandwiched between the two adjacent second outer-side fixed ground terminal contact portions 25*d*, 25*d* adjacent to the second inner-side elastic signal terminal contact portion 22*c*. It is thus possible to substantially block electromagnetic waves radiated from an external source and also to reduce unwanted radiation from the second elastic signal terminals 22 in the second direction S (Y-axis direction).

In the first connector 10, the first inner-side elastic ground terminal contact portion 15*c* of the first elastic ground terminal 15 is located farther inward than the first inner-side fixed signal terminal contact portion 12*c* of the first fixed signal terminal 12 in the second direction S (Y-axis direction). With this configuration, as viewed from the first direction L (X-axis direction), the first inner-side fixed signal terminal contact portion 12*c* is sandwiched between the first inner-side elastic ground terminal contact portion 15*c* and the first outer-side elastic ground terminal contact portion 15*d*. It is thus possible to substantially block electromagnetic waves radiated from an external source and also to reduce unwanted radiation from the first fixed signal terminals 12 in the first direction L (X-axis direction).

In the second connector 20, the second inner-side fixed ground terminal contact portion 25*c* of the second fixed ground terminal 25 is located farther inward than the second inner-side elastic signal terminal contact portion 22*c* of the second elastic signal terminal 22 in the second direction S (Y-axis direction). With this configuration, as viewed from the first direction L (X-axis direction), the second inner-side elastic signal terminal contact portion 22*c* is sandwiched between the second inner-side fixed ground terminal contact portion 25*c* and the second outer-side fixed ground terminal contact portion 25*d*. It is thus possible to substantially block electromagnetic waves radiated from an external source and also to reduce unwanted radiation from the second elastic signal terminals 22 in the first direction L (X-axis direction).

In the electrical connector 10 configured as described above, the signal terminal 12 having the signal terminal length A2, which is shorter than the ground terminal length A1 of the ground terminal 15, is sandwiched between the corresponding ground terminals 15, and also, the signal terminal contact engaging portion 12*c* is positioned within a range of the ground terminal length A1. It is thus possible to secure the shielding properties of the electrical connector 10 and also to reduce the size of the electrical connector 10.

As shown in FIG. 1, when the first connector 10 and the second connector 20 are fitted with each other, the second connector 20 is stored in the first connector 10. Hence, the first connector 10 is a female connector, while the second connector 20 is a male connector. Since the first elastic ground terminals 15 require a certain length of spring to exhibit desired spring properties, they are elongated in the second direction S (Y-axis direction). As discussed above, as a result of disposing the first elastic ground terminals 15 in the first connector 10, which is a female connector, the electrical connector set 1 is not elongated in the second direction S (Y-axis direction). Alternatively, the first fixed signal terminals 12 and the first elastic ground terminals 15 may be disposed in the second connector 20, which is a male connector, and the second elastic signal terminals 22 and the second fixed ground terminals 25 may be disposed in the first connector 10, which is a female connector.

A specific embodiment of the disclosure has been described. However, the disclosure is not restricted to this embodiment and may be modified and carried out in various manners within the scope of the disclosure.

Although in the above-described embodiment the signal terminals 12 and the ground terminals 15 are alternately arranged in the first direction L of the insulating member 11, they may not necessarily be disposed alternately. For example, the signal terminals 12 and the ground terminals 15 may be disposed in order of a signal terminal 12, a ground terminal 15, a ground terminal 15, and a signal terminal 12 in the first direction L of the insulating member 11. If a signal transmitted through the signal terminals 12 is a digital signal, signal terminals 12 may be disposed in order of a signal terminal 12 and a signal terminal 12 in the first direction L of the insulating member 11.

The disclosure and the embodiment can be summarized as follows.

An electrical connector 10 according to an aspect of the disclosure includes: an insulating member 11; a plurality of signal terminals 12 to be fixed and held to the insulating member 11; and a plurality of ground terminals 15 to be elastically held to the insulating member 11. The signal terminals 12 and the ground terminals 15 are disposed in a first direction L of the insulating member 11. Regarding the ground terminal 15 and the signal terminal 12 adjacent to each other as viewed from the first direction L, the signal terminal length A2 of the signal terminal 12 in a second direction S, which is perpendicular to the first direction L, is shorter than the ground terminal length A1 of the ground terminal 15 in the second direction S. The signal terminal 12 includes a signal terminal contact engaging portion 12*c*. The signal terminal contact engaging portion 12*c* is positioned within a range of the ground terminal length A1 as viewed from the first direction L.

With this configuration, the signal terminal 12 having the signal terminal length A2 shorter than the ground terminal length A1 of the ground terminal 15 is sandwiched between the ground terminals 15, and also, the signal terminal contact engaging portion 12*c* is positioned within a range of the ground terminal length A1. It is thus possible to secure the shielding properties of the electrical connector 10 and also to reduce the size of the electrical connector 10.

In the electrical connector 10 according to an embodiment, the ground terminal 15 includes a ground terminal contact engaging portion 15*d*, and the ground terminal contact engaging portion 15*d* is located toward the outer edge of the insulating member 11 in the second direction S.

According to this embodiment, it is possible to substantially block electromagnetic waves (noise) radiated from an external source and also to reduce unwanted radiation from the signal terminal 12 to an external source.

In the electrical connector 10 according to an embodiment, the ground terminal 15 includes a ground terminal contact engaging portion 15*c*, and the ground terminal contact engaging portion 15*c* is located toward the center of the insulating member 11 in the second direction S.

According to this embodiment, it is possible to reduce interference of electromagnetic waves (noise) on the interior side of the insulating member 11.

In the electrical connector 10 according to an embodiment, the ground terminal 15 includes two ground terminal contact engaging portions 15*c* and 15*d*, and one of the two ground terminal contact engaging portions 15*c* and 15*d* is located toward the outer edge of the insulating member 11 in the second direction S, while the other one of the two ground terminal contact engaging portions 15*c* and 15*d* is located toward the center of the insulating member 11 in the second direction S.

According to this embodiment, it is possible to substantially block electromagnetic waves (noise) radiated from an external source and to reduce unwanted radiation from the signal terminal 12 to an external source and also to reduce interference of electromagnetic waves (noise) on the interior side of the insulating member 11.

In the electrical connector 10 according to an embodiment, the ground terminal 15 includes a one-side ground terminal contact engaging portion 15*d* on one side of the second direction S and an other-side ground terminal contact engaging portion 15*c* on the other side of the second direction S. In the second direction S, the other-side ground terminal contact engaging portion 15*c* is located on a side opposite the side of the one-side ground terminal contact engaging portion 15*d* with the signal terminal contact engaging portion 12*c* interposed therebetween.

According to this embodiment, as viewed from the first direction L (X-axis direction), the signal terminal contact engaging portion 12*c* is sandwiched between the inner-side fixed ground terminal contact portion 15*c* and the outer-side fixed ground terminal contact portion 15*d*. It is thus possible to substantially block electromagnetic waves radiated from an external source and also to reduce unwanted radiation from the signal terminal 12 in the first direction L (X-axis direction).

In the electrical connector 10 according to an embodiment, a plurality of rows, each of which is constituted by the signal terminals 12 and the ground terminals 15 alternately disposed in the first direction L, are disposed in the second direction S. The signal terminal 12 in a certain row and the ground terminal 15 in a row adjacent to this certain row are located adjacent to each other in the second direction S.

According to this embodiment, crosstalk between the signal terminal 12 in the first row (certain row) and that in the second row (adjacent row) can be reduced.

In the electrical connector 10 according to an embodiment, the signal terminals 12 are fixed and held to the insulating member 11 by insert molding.

According to this embodiment, even when a probe is pressed against the signal terminals 12 for measurement, the signal terminals 12 are not deformed.

In the electrical connector 10 according to an embodiment, the outer peripheral section of the insulating member 11 is surrounded by an external ground member 16.

According to this embodiment, the space surrounded by the external ground member 16 can be formed into an electromagnetic-wave shielded space, thereby blocking electromagnetic waves radiated from an external source and unwanted radiation from the signal terminals 12.

In the electrical connector 10 according to an embodiment, the electrical connector is a female connector.

According to this embodiment, as a result of disposing the ground terminals 15 in the female electrical connector 10, an electrical connector set including the female electrical connector 10 is not elongated in the second direction (Y-axis direction).

An electrical connector set 1 according to an aspect of the disclosure includes the above-described electrical connector 10 and a mating electrical connector 20 that is fittable with the electrical connector 10.

With this configuration, it is possible to provide the electrical connector set 1 in which the shielding properties of the electrical connector 10 can be secured and the size of the electrical connector 10 can also be reduced.

What is claimed is:

1. An electrical connector comprising:

an insulating member having two outer edges extending in a first direction and being opposite to each other in a second direction perpendicular to the first direction;

a plurality of signal terminals configured to be fixed and held to the insulating member; and a plurality of ground terminals configured to be elastically held to the insulating member, wherein the signal terminals and the ground terminals are disposed in the first direction of the insulating member, the ground terminals and the signal terminals are adjacent to each other as viewed from the first direction, and a signal terminal length of the signal terminal in the second direction, which is perpendicular to the first direction, is shorter than a ground terminal length of the ground terminal in the second direction, the signal terminal includes a signal terminal contact engaging portion positioned within a range of the ground terminal length as viewed from the first direction, and the ground terminal includes two ground terminal contact engaging portions, one of the two ground terminal contact engaging portions being located toward one of the outer edges of the insulating member in the second direction, and an other one of the two ground terminal contact engaging portions being located toward a center of the insulating member in the second direction, the signal terminal contact engaging portion being located between the two ground terminal contact engaging portions in the second direction, wherein the signal terminals and the ground terminals are alternately disposed in the first direction, and the signal terminal contact engaging portions of the signal terminals disposed on opposite sides of one of the ground terminals in the first direction are located between the two ground terminal contact engaging portions of the one of the ground terminals in the second direction when viewed in the first direction.

2. The electrical connector according to claim 1, wherein:

a plurality of rows, each of the plurality of rows being constituted by the signal terminals and the ground terminals alternately disposed in the first direction, are disposed in the second direction; and the signal terminal in a certain row and the ground terminal in a row adjacent to the certain row are located adjacent to each other in the second direction.

3. The electrical connector according to claim 1, wherein the signal terminals are fixed and held to the insulating member by insert molding.

4. The electrical connector according to claim 1, wherein the ground terminals are configured by bending a conductive bar-shaped member.

5. The electrical connector according to claim 1, wherein the electrical connector is a female connector.

6. An electrical connector set comprising:

the electrical connector according to claim 1; and a mating electrical connector that is fittable with the electrical connector.

7. The electrical connector set according to claim 6, wherein a length of a signal terminal of the mating electrical connector is shorter than a length of a ground terminal of the mating electrical connector in the second direction when viewed from the first direction.

8. The electrical connector set according to claim 6, wherein one of end portions of the signal terminal of the electrical connector is located between end portions of the signal terminal of the mating electrical connector in the second direction, and one of the end portions of the signal terminal of the mating electrical connector is located between the end portions of the signal terminal of the electrical connector in the second direction.

9. The electrical connector according to claim 1, wherein the signal terminal is bent in a substantially L shape and has a fixed signal terminal body and a fixed signal terminal mounting portion, the fixed signal terminal includes a contact extending portion extending in an insertion/removal direction and serving as the signal terminal contact engaging portion and a mounting extending portion extending in the second direction, and the ground terminal has an elastic ground terminal body and an elastic ground terminal mounting portion, the elastic ground terminal body includes an arm portion bending in a U shape, a mounting extending portion extending in the second direction, and a bending connecting portion which is bent to connect the arm portion and the mounting extending portion, and the arm portion is supported by the bending connecting portion in a cantilever structure so as to exhibit spring properties.

10. An electrical connector comprising:

an insulating member;

a plurality of signal terminals configured to be fixed and held to the insulating member; and a plurality of ground terminals configured to be elastically held to the insulating member, wherein the signal terminals and the ground terminals are disposed in a first direction of the insulating member, the ground terminals and the signal terminals are adjacent to each other as viewed from the first direction, and a signal terminal length of the signal terminal in a second direction, which is perpendicular to the first direction, is shorter than a ground terminal length of the ground terminal in the second direction, the signal terminal includes a signal terminal contact engaging portion positioned within a range of the ground terminal length as viewed from the first direction, and the ground terminal includes a one-side ground terminal contact engaging portion on one side of the second direction and an other-side ground terminal contact engaging portion on an other side of the second direction, the other-side ground terminal contact engaging portion being located on a side opposite a side of the one-side ground terminal contact engaging portion with the signal terminal contact engaging portion interposed therebetween in the second direction, wherein the signal terminals and the ground terminals are alternately disposed in the first direction, and the signal terminal contact engaging portions of the signal terminals disposed on opposite sides of one of the ground terminals in the first direction are located between the one-side ground terminal contact engaging portion and the other-side ground terminal contact engaging portion of the one of the ground terminals in the second direction when viewed in the first direction.

11. The electrical connector according to claim 10, wherein:

a plurality of rows, each of the plurality of rows being constituted by the signal terminals and the ground terminals alternately disposed in the first direction, are disposed in the second direction; and the signal terminal in a certain row and the ground terminal in a row adjacent to the certain row are located adjacent to each other in the second direction.

12. The electrical connector according to claim 10, wherein the signal terminals are fixed and held to the insulating member by insert molding.

13. The electrical connector according to claim 10, wherein the ground terminals are configured by bending a conductive bar-shaped member.

14. The electrical connector according to claim 10, wherein the electrical connector is a female connector.

15. An electrical connector set comprising:

the electrical connector according to claim 10; and a mating electrical connector that is fittable with the electrical connector.

16. The electrical connector set according to claim 15, wherein a length of a signal terminal of the mating electrical connector is shorter than a length of a ground terminal of the mating electrical connector in the second direction when viewed from the first direction.

17. The electrical connector set according to claim 15, wherein one of end portions of the signal terminal of the electrical connector is located between end portions of the signal terminal of the mating electrical connector in the second direction, and one of the end portions of the signal terminal of the mating electrical connector is located between the end portions of the signal terminal of the electrical connector in the second direction.

18. The electrical connector according to claim 10, wherein the signal terminal is bent in a substantially L shape and has a fixed signal terminal body and a fixed signal terminal mounting portion, the fixed signal terminal includes a contact extending portion extending in an insertion/removal direction and serving as the signal terminal contact engaging portion and a mounting extending portion extending in the second direction, and the ground terminal has an elastic ground terminal body and an elastic ground terminal mounting portion, the elastic ground terminal body includes an arm portion bending in a U shape, a mounting extending portion extending in the second direction, and a bending connecting portion which is bent to connect the arm portion and the mounting extending portion, and the arm portion is supported by the bending connecting portion in a cantilever structure so as to exhibit spring properties.

19. The electrical connector according to claim 10, wherein the signal terminal has only one signal terminal contact engaging portion; and the only one signal terminal contact engaging portion is located between the one-side ground terminal contact engaging portion and the other-side ground terminal contact engaging portion in the second direction.

* * * * *